(12) United States Patent
Seki

(10) Patent No.: US 6,430,823 B1
(45) Date of Patent: Aug. 13, 2002

(54) DATUM PLANE SETTING DEVICE

(76) Inventor: Yuji Seki, 3-1-11, Sanuki, Ryugasaki-shi, Ibaraki 301-0032 (JP)

(*) Notice: Subject to any disclaimer, the term of this patent is extended or adjusted under 35 U.S.C. 154(b) by 0 days.

(21) Appl. No.: 09/486,376

(22) PCT Filed: May 31, 1999

(86) PCT No.: PCT/JP99/02873
§ 371 (c)(1),
(2), (4) Date: Feb. 28, 2000

(87) PCT Pub. No.: WO00/73740
PCT Pub. Date: Dec. 7, 2000

(51) Int. Cl.[7] ............................................. G01B 11/26
(52) U.S. Cl. ............................................. 33/281; 33/286
(58) Field of Search .......................... 33/227, 228, 281, 33/282, 283, 285, 286, 290, 331, 370, 334, 276, DIG. 21

(56) References Cited

U.S. PATENT DOCUMENTS

| | | | | |
|---|---|---|---|---|
| 5,475,930 A | * | 12/1995 | Kimura | 33/290 |
| 5,983,510 A | * | 11/1999 | Wu et al. | 33/286 |
| 6,065,217 A | * | 5/2000 | Dong | 33/286 |

FOREIGN PATENT DOCUMENTS

| | | |
|---|---|---|
| JP | 5-14822 | 2/1993 |
| JP | 5-99671 | 4/1993 |
| JP | 5-312570 | 11/1993 |
| JP | 9-159451 | 6/1997 |
| JP | 10-295066 | 11/1998 |
| JP | 10-311726 | 11/1998 |
| JP | 11-23274 | 1/1999 |

* cited by examiner

*Primary Examiner*—Christopher W. Fulton
(74) *Attorney, Agent, or Firm*—Nixon Peabody LLP; Thomas W. Cole

(57) ABSTRACT

A datum plane setting device capable of generating two or three reference planes is provided. The device includes a motor 6, rotary bodies 3 (3x, 3y, and 3z) which rotate in accordance with rotary driving of said motor via a direct drive and belt drive, rotary heads 8 formed on the tip end portions of said rotary bodies 3, laser emitting portions 9 which are accommodated inside said rotary heads 8 and rotate with said rotary heads 8 as one body. A power source supplies current for the motor 6 and laser emitting portions 9. A casing 2 accommodates the motor 6, rotary bodies 3, power source 5, supporting members for horizontally supporting said casing, and a level 27 for confirming a level of said casing. The laser emitting portions 9 are constructed so that current is supplied from the power source 5 via current-supplying brushes 1501 which contact guiding paths provided around the rotary bodies 3.

5 Claims, 11 Drawing Sheets

FIGURE 10A
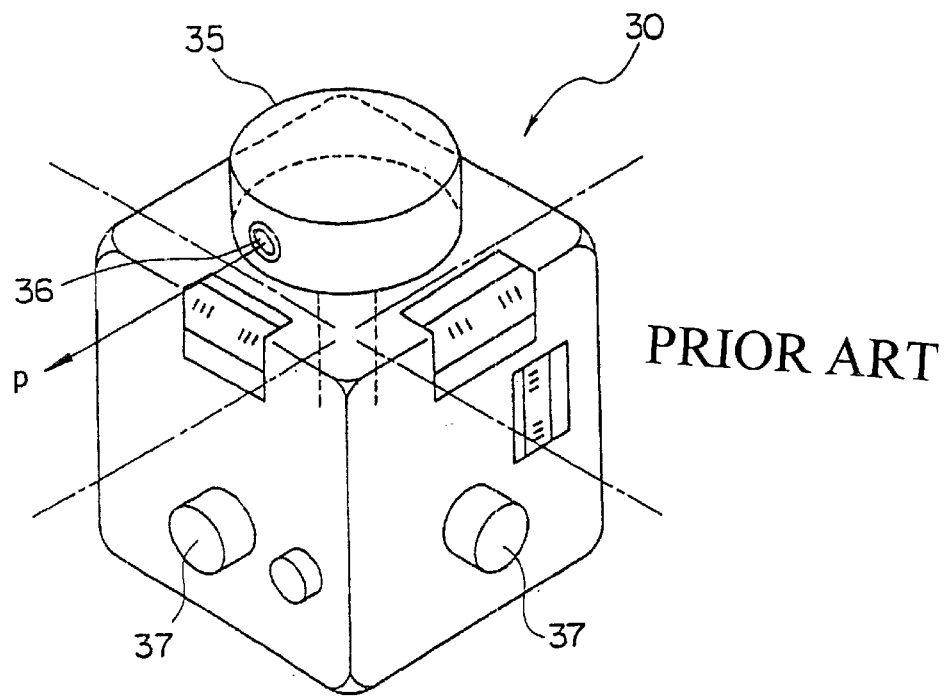
PRIOR ART
PRIOR ART
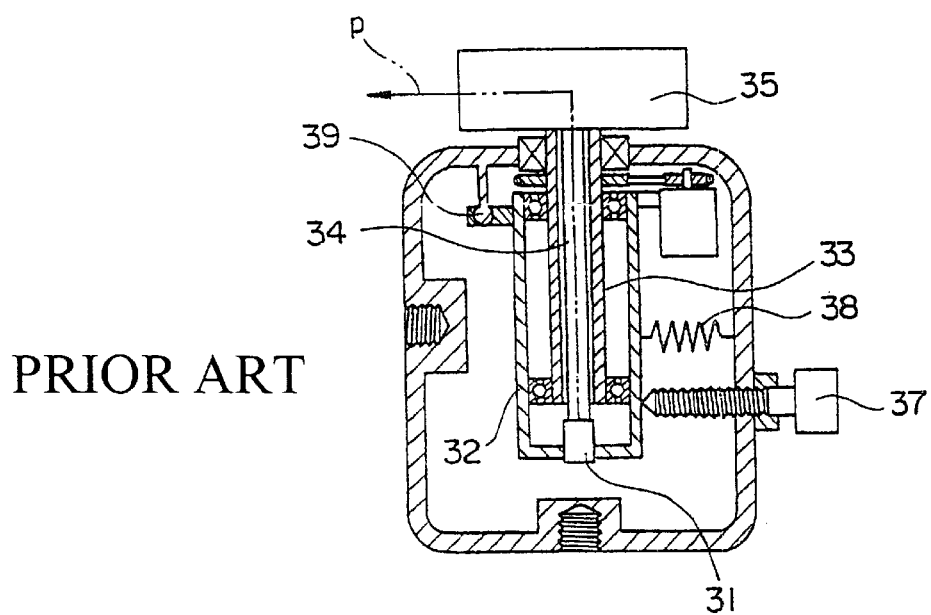
FIGURE 10B

DATUM PLANE SETTING DEVICE

TECHICAL FIELD

The present invention relates to a datum plane setting device used for surveys and, more specifically, a datum plane setting device in which, by laser light emitted in the orthogonal direction with respect to rotary bodies, a plurality of rotating irradiated planes can be simultaneously formed.

BACKGROUND ART

Conventionally, a datum plane setting device is known as a device used when setting a flat horizontal datum plane on a side wall and pillars of architectural structures and setting a vertical datum plane on a floor, ceiling, and side wall of architectural structures.

As a typical datum plane setting device also known as a laser planer, a first prior art is disclosed in Japanese Laid-open Patent Publication No. Hei-6-313713.

In a datum plane setting device 30 of this type as shown in FIG. 10, a laser emitting portion 31 is arranged at the lowest portion of a bearing sleeve 32 which is disposed from top to bottom inside a casing.

And a composition is employed wherein, a laser light p emitted from the laser emitting portion 31 proceeds upward through a light guiding path 34 which is formed to penetrate the inside of a rotary body 33 in the vertical direction, reflects on a reflection prism (not illustrated) arranged inside a rotary head 35 at a right angle, and is emitted from a light irradiating port 36 to the outside.

Therefore, in order to accurately emit the laser light in the orthogonal direction with respect to the rotary body 33, it is necessary to set the relative positional relationship with high accuracy while there were problems in that if the device falls or drops at a construction site, the position of the reflection prism shifts and errors are often generated.

Also, because a composition is employed wherein, leveling adjustment is carried out by tilting the bearing sleeve 32 itself, parts with respect to the tilting mechanism of the bearing sleeve 32 (such as a sleeve supporting spring 38 and ball joint 39) are great in number and the composition is complicated.

Accordingly, there were not only problems in that errors often occurred and malfunctions were frequent but also drawbacks in that the relative relationship between operational (rotary) direction of a leveling adjustment screw 37 and tilting direction of the rotary body 33 (or rotating irradiated plane) was difficult to understand and there was a drawback in operability, as well.

Therefore, in order to solve the aforementioned technical problems, the present applicant made a proposal of a datum plane setting device 40 in the Japanese Laid-open Patent Publication No. Hei-11-23274, in that a composition is employed, wherein a laser emitting portion is disposed inside the rotary head arranged to protrude from the casing to the outside.

The datum plane setting device 40, also referred to as a second prior art, as shown in FIG. 11, is provided in that, a casing 45, a unit 46 which is supported swingably against said casing 45, and a leveling adjustment mechanism 47 for leveling adjustment said unit 46.

And in the unit 46, a rotary body 50 consists of a shaft 43 which is rotatably supported by bearing blocks 49 and a rotary head 42 which is formed to integrate with said shaft 43 and be exposed from the casing, and a driving mechanism (a motor 48) for rotating this rotary body 50 are disposed and integrated.

In the rotary head 42, a laser emitting portion 41 is held and the rotary body 50 rotates, whereby a laser light emitted from the laser emitting portion 41 forms a rotating irradiated plane. As for a current-supplying means, it is contrived so that a brush current-supplying portion 51 is disposed onto the base section outer circumference of the rotary head 42.

According to the composition, the laser emitting portion 41 is accommodated and fixed inside the rotary head 42 and rotates with the rotary head 42 as one body whereby, a rotating irradiated plane can be formed, therefore, a datum plane measuring device 40 with a simple configuration, which allows to project an accurate datum plane (line) without errors, is simple and clearly understandable in operation, and has a wide application range, can be provided.

However, existing datum plane measuring devices including the aforementioned prior art are comprised in that only one rotating irradiated plane can be formed during one datum plane setting work, therefore, there was such an inconvenience in that both the irradiation plane of a horizontal plane and vertical plane cannot be set at the same time.

That is, where both the horizontal plane and vertical plane are set and an intersectional point of a horizontal line and a vertical line which were projected and formed on walls by each plane is determined, and furthermore, where three planes consisting of a horizontal plane, a vertical plane, and a plane orthogonal to both planes are demanded, it was necessary to work to put marks (marking work) in order.

Also, there have been problems in that, for a setting work of each plane, it is necessary to install a datum plane setting device so that a desired plane is formed and perform a leveling work for each time, thereby, a great amount of time and labor it required and when leveling a horizontal plane and leveling a vertical plane, it is necessary to place a device upright or on its side for use, thereby, the internal structure necessarily becomes complicated for avoiding interference and errors between members inside the device.

Therefore, the object of the present invention is to provide a datum plane setting device having a simple structure and whereby a plurality of datum planes can be set at one time with accuracy.

DISCLOSURE OF THE INVENTION

In order to achieve the aforementioned object, the following invention is employed.

A datum plane setting device comprising;

(1) a motor, (2) rotary bodies which rotate in accordance with a rotary driving of said motor, (3) rotary head portions which are formed on the tip end to form a plurality of orthogonal rotating irradiated planes at the same time.

(4) laser emitting portions which are accommodated inside said rotary head portions and rotate with said rotary heads as one body, (5) a power source portion which supplies current for the motor and the laser emitting portion, (6) a casing which accommodates at least the motor, the rotary shaft, and the power source portion, (7) supporting members for horizontally supporting said casing thereof, and (8) a level which confirms the horizontal level of said casing, and a datum plane setting device wherein, (9) for the laser emitting portions, current is supplied from the power supplying portion via supplying brushes which contact current guiding paths provided to surround the rotary bodies,

(10) at least two or more rotary bodies are disposed so as to be orthogonal with each other and said plurality of rotary bodies are made to be rotatable at the same time.

According to the present invention, a laser emitting portion is accommodated inside a rotary head and rotary bodies comprising this rotary head are orthogonally arranged, whereby allowing to form a plurality of orthogonal rotating irradiated planes at the same time.

Also, promptly determining an intersectional point of each rotating irradiated plane becomes possible.

Furthermore, a datum plane setting device being comprised in that, for the laser emitting portion, current is supplied from the power source portion via supplying brushes which contact current guiding paths provided so as to surround the rotary body, whereby, for the laser emitting portion rotating with the rotary head (rotary body) as one body, a current supply is securely carried out from the power source portion which is arranged so as to be alienated from the rotary body. Additionally, where a plurality of rotary bodies are arranged, since a current-supplying means does not become complicated and current-supplying means do not interfere with each other, simplification in device structure can be attained.

That is, as a current-supplying means for the laser emitting portion in the datum plane setting device, according to the present invention, wherein a plurality of rotary bodies are arranged, the configuration is extremely preferable.

The invention further comprises a datum plane setting device wherein the rotary bodies include (1) a first rotary body fixed to a rotary axis of the motor and (2) one second rotary body or more which is structured so as to drive via a pulley formed on the rotary axis portion and a belt wound on said pulley.

According to the invention, by rotating a rotary axis of one motor, other second rotary bodies can be rotated at the same time, therefore, there is no need to provide a motor for each of the rotary bodies disposed in plurality and lighting of the device and simplification in the configuration can be attained.

A datum plane setting device as set forth in Claim 3 is structured in that a casing as described in Claim 1 through Claim 3 is supported slidably in X axis and Y axis directions by a predetermined positional adjusting unit.

According to the invention, since a positional adjustment of the casing inside of which such rotary bodies are accommodated can be performed in X axis and Y axis directions, a more accurate datum plane setting is allowed to be carried out.

The supporting members support the casing against a device installed surface such as a floor at four points in total forming a square shape, and one point of the supporting members is a fixing supporting member, another point on the diagonal line of the fixing supporting member is a buffering supporting member which applies force upward by an elastic member, and two supporting members on the remainder of the diagonal line are provided with a leveling adjustment screw for horizontal leveling up, respectively.

According to the invention, a horizontal leveling adjustment work of the casing performed before the datum plane setting work, is comprised in that, at two points on the approximately diagonal line of the casing, by operating to turn the leveling adjustment screws, leveling adjustment can be carried out, whereby, horizontal leveling of the casing is allowed to be easily and accurately performed.

Each of the rotary bodies may be freely attached and removed.

According to the invention, a rotary body can be attached in accordance with the number of desired rotating irradiated planes, therefore, the device is widely used for general purposes.

Also, where an undesired rotating irradiated plane exists, a corresponding rotary body is removed and simplification and lighting of the device are allowed to be attempted, and accordingly, great convenience is provided.

BRIEF DESCRIPTION OF DRAWINGS

FIGS. 10 (A) and (B) are views showing a first prior art of a datum plane setting device.

PREFFERED EMBODIMENTS OF THE INVENTION

Hereinafter, preferred embodiments of the present invention will be described in detail with reference to the attached drawings.

Figure 1:
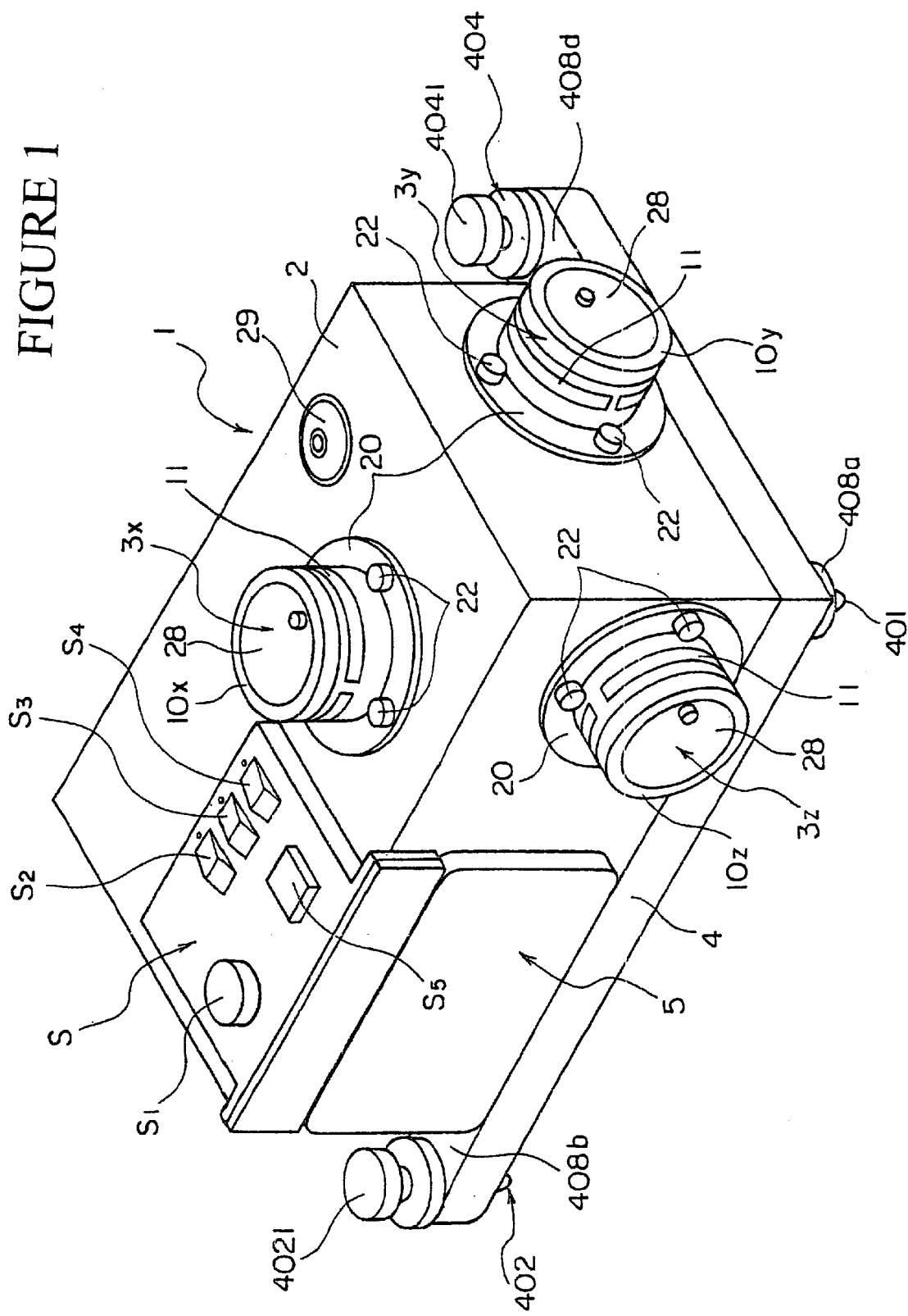
FIG. 1 is an appearance perspective view of a datum plane setting device 1 according to a preferred embodiment of the present invention.

First, with reference to FIG. 1 showing an appearance perspective view of a datum plane setting device of a preferred embodiment of the present invention, the outer appearance configuration is briefly described.

A symbol 1 shows a datum plane setting device (hereinafter referred to as "device"). In the device 1, a variety of members are accommodated and supported in an approximately rectangular solid casing 2 and, on the forward portion of the casing 2, rotary head 8 (8x, 8y, and 8z) portions covered by covers 10 of rotary bodies 3 (3x, 3y, and 3z), which will be described later, are provided to project forward, upward, and sideward.

Furthermore, the rotary bodies 3x, 3y, and 3z are positioned and arranged so as to be orthogonal with each other, respectively.

An approximately rectangular projected portion, which is provided to project and shown by a symbol S located at the back area of the rotary body 3x provided to project the casing 2 upward, is a control box wherein, switches S2, S3, and S4 for directing rotational starts and ends of each rotary body 3 and a controller S1 for controlling rotational speeds of said rotary bodies 3 are provided.

Next, a board member 4 disposed under the casing 2 so as to load the casing 2 is a positional adjusting unit wherein, a mechanism (described later) which allows the casing 2 to slide in X axis and Y axis directions is disposed.

At four corner sections of such positional adjusting unit 4, supporting members 401 through 404 are provided. These supporting members 401 through 404 are members for supporting the device 1 against installations locations such as a room floor or ground and also play a role in achieving horizontal leveling adjustment of the casing 2 (described later).

Furthermore, if the supporting member 401 is provided to protrude sideward from the casing 2 (unit 4) (comprised, for example, in the supporting member 404), the supporting member 401 overlaps with Q5 which is one of the intersectional points between vertical datum planes $V_1$ and $V_2$, therefore, the supporting member 401 is formed at a position dragged under the casing 2.

On the upper surface of the casing 2, a level 29 having a structure in that a bubble moves in accordance with tilting of the casing 2. This level 29 is used when confirming a horizontal level of the casing 2.

Furthermore, the level 29 is not limited to that of a circular shape as shown in FIG. 1, etc., but two narrow bubble tubes may be arranged in width and length directions and, on the basis of the demanded accuracy of the horizontal leveling, an appropriate level can be selected.

Hereinafter, the inside structure of the device 1 and component arrangement configuration will be described in detail based on FIG. 2 through FIG. 5.

Figure 2:
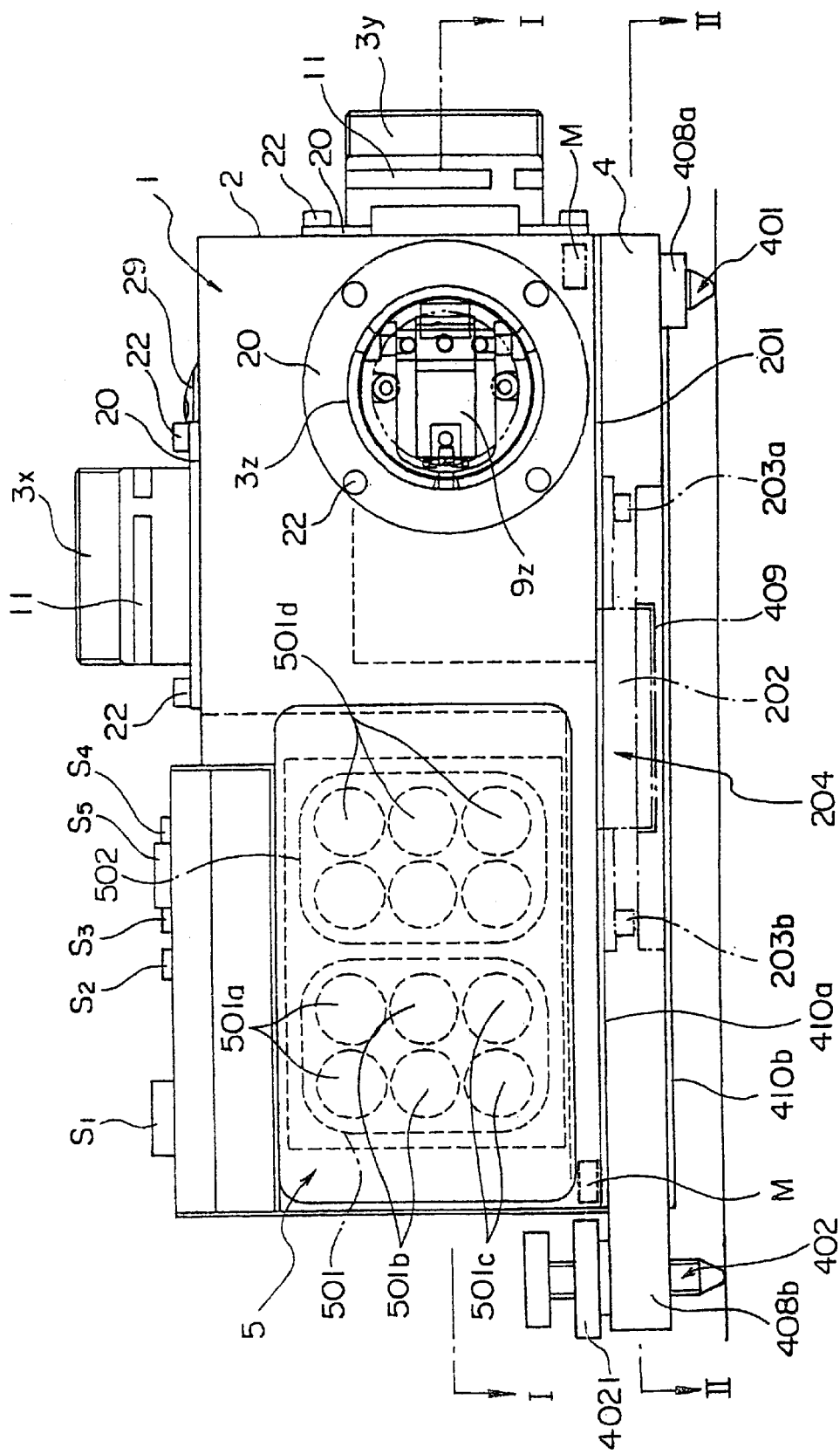
FIG. 2 is a side view showing a part of the inside of the same device 1 with virtual lines.

First, with reference to FIG. 2 showing a side view of the same device 1, a power source portion 5 where twelve cells are arranged in total is provided in the area downward the control box S provided on the upper surface of the casing 2.

This power source portion 5 supplies current necessary for driving to rotate rotary bodies 3x, 3y, and 3z and laser-emitting of laser emitting portions 9x, 9y, and 9z, which are accommodated and fixed in said rotary body 3x, 3y, and 3z.

Herein, the power source portion 5 is partitioned mainly into two chambers, and one chamber 501 functions as a power source section for laser emissions and the other chamber 502 functions as a power source section for driving to rotate the rotary bodies 3, respectively.

Each pair of cells 501a, 501b, and 501c arranged at upper, middle, and lower sections in pairs, is assigned to the rotary bodies 3x, 3y, and 3z so as to supply with current, respectively.

Furthermore, the power source portion 5 is structured so as to be freely attached and removed with respect to the casing 2 and chargeable.

Figure 3:
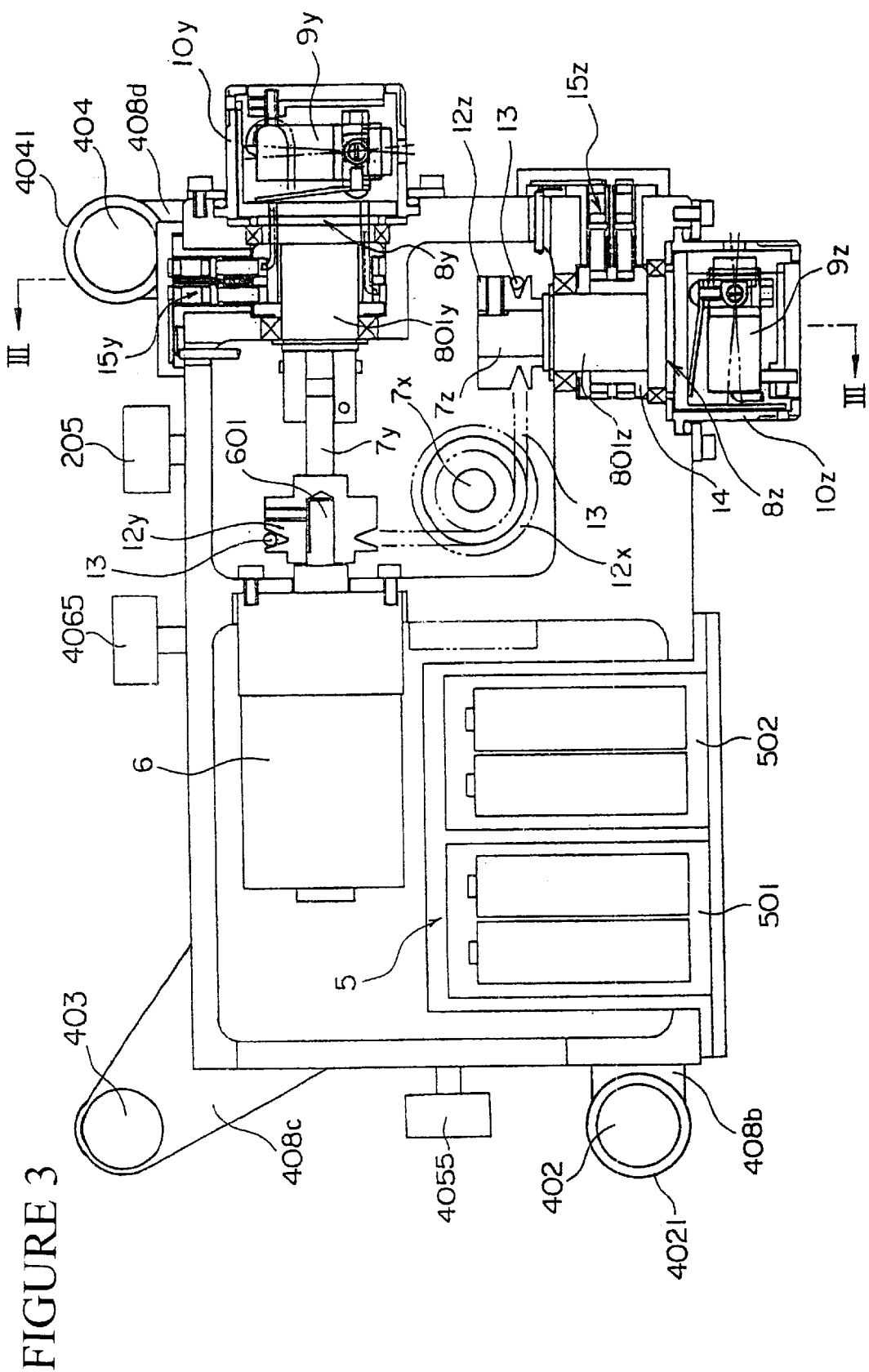
FIG. 3 is a sectional view taken along the line I—I in FIG. 2.

Next, a symbol 6 shown in FIG. 3 indicates a motor which is a driving portion of the same device 1.

This motor is provided with a rotary axis 601 which rotates the rotary bodies 3x, 3y, and 3z at the same time and a pulley 12y is provided to surround this rotary axis 601 and structured to rotate with the rotary axis 601 as one body.

A belt 13 is wound on (V groove of) the pulley 12y and this belt 13 is wound so as to travel around pulleys 12x and 12y which are provided to surround rotary shafts 7x and 7z of the rotary bodies 3x and 3z.

According to the composition, rotary driving of the motor 6 is directly transmitted to the rotary body 3y via a rotary shaft 7y which is fixed onto the rotary axis and also transmitted to the rotary bodies 3x and 3y via the belt 13 comprised as above. That is, a structure is provided in that, by turning ON a switch S5 to drive the motor 6, three rotary bodies 3x, 3y, and 3z rotate at the same time. Moreover, a means for rotating the rotary bodies 3x, 3y, and 3z at the same time is not limited to the above composition, but an appropriate means can be selected.

Figure 4:
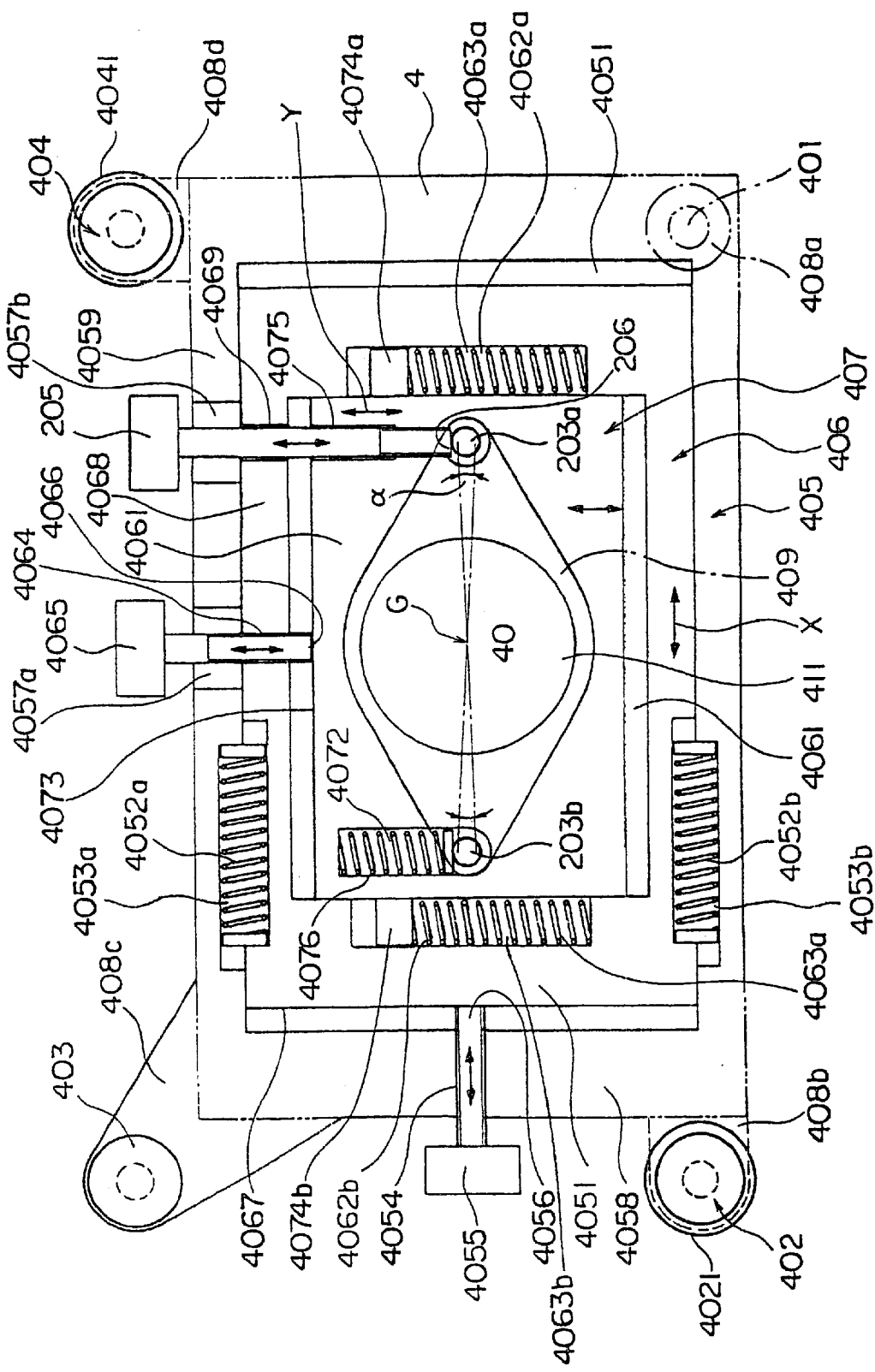
FIG. 4 is a sectional view taken along the line II—II in FIG. 2.

Subsequently, a composition of a positional adjusting unit 4 (hereinafter referred to as "unit") of the casing 2 shown in FIG. 4 will be described in detail.

The unit 4 consists of, when roughly divided, an outer frame panel 405 which has a form wherein the center area is hollowed to become rectangular and which is arranged on the most outer side, a middle frame panel 406 which is accommodated in a hollowed portion 4051 of this outer frame panel 405, and an inner panel 407 which is accommodated in a hollowed portion 4061 formed by hollowing the center area of this middle frame panel 406 and which has a predetermined form (described later) for supporting the casing 2.

Herein, in the length direction of the outer frame panel 405 and middle frame panel 406, partially in a face-contacted area between wall surfaces, gap portions 4053a and 4053b are formed. In the gap portions 4053a and 4053b, respectively, springs 4052a and 4052b are accommodated in the length direction and apply force to the middle frame panel 406 towards the device 1 back side (the side of supporting members 402 and 403).

Also, a female screw hole 4054 is formed through the center portion of a rear panel 4058 of the outer frame panel 405 in the length direction and a first adjusting screw 4055 is screwed into the female screw hole 4054.

A tip end portion 4056 of this first adjusting screw 4055 comes into contact with a backward wall surface 4067 of the middle frame panel 406, allowing to position the middle frame panel 406, which slides with the inner panel 407 as one body, and the casing 2, which is integrated and supported by the inner panel 407, in the length direction (hereinafter referred to as "X axis direction").

According to the composition, by operating to tighten and loosen the first adjusting screw 4055, position of the casing 2 can be minutely adjusted in the X axis direction.

Then, in the face-contacted portion between the width direction wall surfaces of the middle frame panel 406 and inner panel 407, gap portions 4063a and 4063b are formed. In the gap portions 4063a and 4063b, respectively, springs 4062a and 4062b are accommodated in the width direction (hereinafter referred to as "Y axis direction").

One end of the respective springs 4062a and 4062b come into contact with the convex portions 4074a and 4074b which are convexly provided on both width directional wall surface sides and apply force to the inner panel 407 toward the Y axis direction.

Also, a female screw hole 4064 is formed to penetrate the center portion of a side panel 4068 of the middle frame panel 406 (on the supporting members 403 and 404 side) in the Y axis direction, and in the female screw hole 4064, a second adjusting screw 4065, which is inserted from a hole 4057a formed from the length direction side wall surface of the outer frame panel 405, is screwed.

Furthermore, a tip end portion 4066 of this second adjusting screw 4065 comes into contact with a length direction side wall surface 4073 of the inner panel 407 which is applied with force by the springs 4062a and 4062b, allowing to position the inner panel 407 and casing 2, which is supported by this inner panel 407, in the Y axis direction.

According to the composition, by operating to tighten and loosen the second adjusting screw 4065, the position of the casing 2 can be minutely adjusted in the Y axis direction.

Moreover, in the present device 1, means hereinafter described are employed, and whereby, an angle of the casing 2 (angle α shown in FIG. 4) can be easily adjusted.

That is, as shown in FIG. 2, a casing supporting portion 204 having a flat circular convex portion 202 and a pair of small bosses 203a and 203b which are formed to nip this circular convex portion 201 is fixed at the center of the casing bottom surface 201.

The circular convex portion 202 is fitted into a supporting hole 411 which is formed at the center of the inner panel 407 and face each other when the casing 2 is mounted onto the unit 4, thereby the casing 2 is fixated on the unit 4. According to the composition, the casing 2 is integrated into the unit 4 and supported.

Furthermore, in the unit 4, a third adjusting screw 205, which is inserted from a hole 4057b which is formed through the side panel 4059 of the outer frame panel 405 in the Y axis direction, is screwed into a female screw hole 4069 formed in the middle frame panel 406 so as to correspond to this hole 4057b position and a female screw hole 4075 formed in the inner panel 407.

Furthermore, a tip end portion 206 of this third adjusting screw 205 comes into contact with the circumferential surface of one small boss 203a (refer to FIG. 2, as well) hanging down from the casing bottom surface 201 and, with the circumferential surface of the other small boss 203b, a spring 4072 which is disposed at a predetermined position 4076 of the inner panel 407 in the Y axis direction comes into contact from the same side as the screwed direction of the third adjusting screw 205.

According to the composition, by operating to tighten and loosen the third adjusting screw 205, an angle α with respect to the center G of the casing 2 (refer to FIG. 4) as a center axis can be minutely adjusted.

Herein, at four corner portions of the outer frame panel 405, supporting portions 401, 402, 403, and 404 supporting the entire device 1 against a floor and ground are provided.

A first supporting portion shown by a symbol 401 is provided to project downward from the bottom surface of the outer frame panel 405 corner portion which is most approximate to a rotary body 3z and serves for fixing and supporting, a second and fourth supporting portions shown by symbols 402 and 404 are provided with leveling adjustment screws 4021 and 4041, respectively, and serve for horizontal leveling adjustment work of the casing 2, and a third supporting portion shown by symbol 403 is provided a spring inside which is not shown and serves for buffering.

Hereinafter, the composition and structure of the rotary bodies 3 (3x, 3y, and 3z) disposed in the device 1 will be concretely described with reference to FIG. 5 through FIG. 8.

Figure 5:
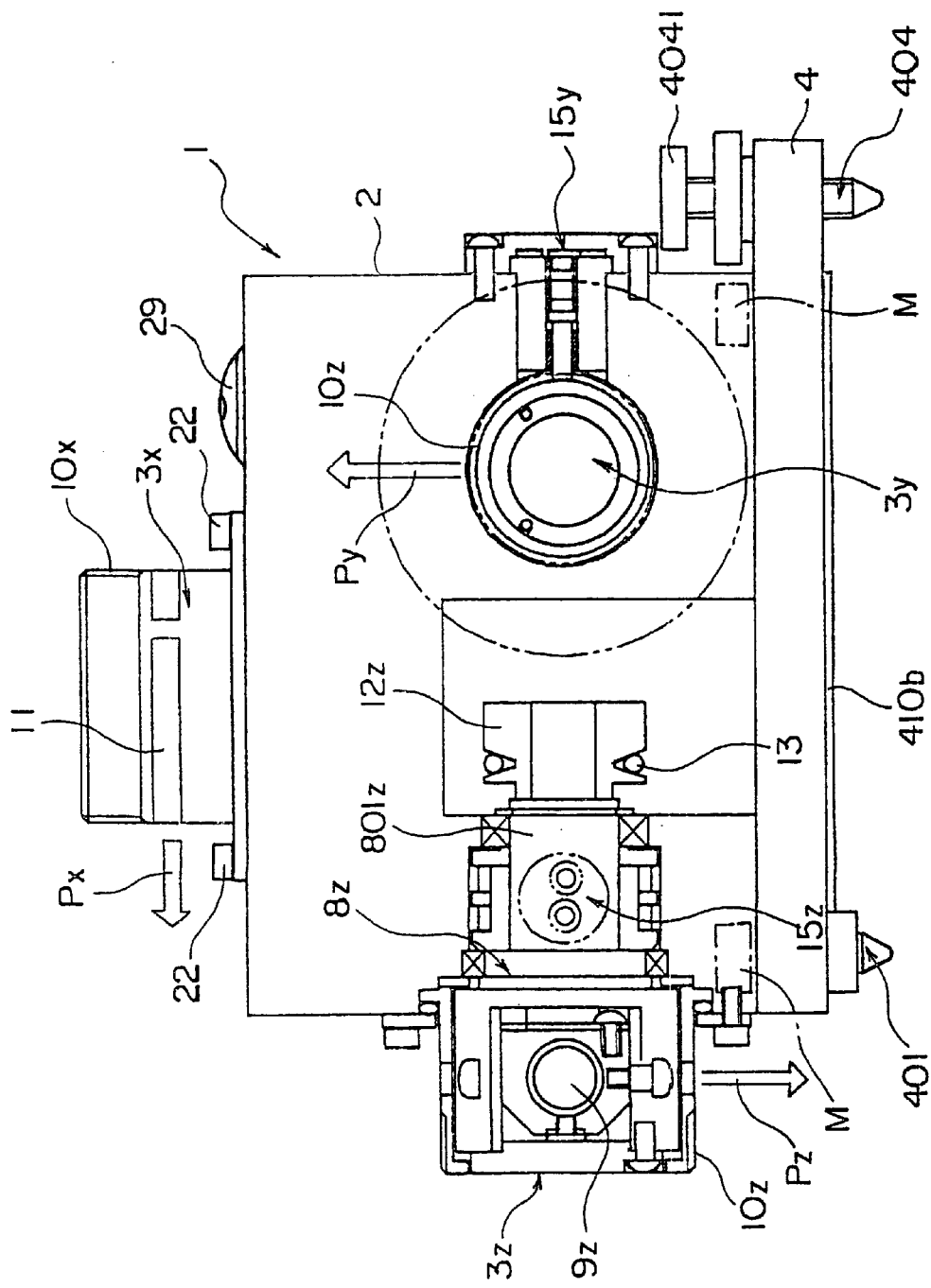
FIG. 5 is a front view shown from the first rotary body 3y direction of the same device 1.

As shown in FIG. 5 which is a front view of the same device 1 viewed from the first rotary body 3y direction, the rotary bodies 3x, 3y, and 3z are arranged to be orthogonal with each other wherein, the first rotary body 3y is provided to project forward (proximate side of the figure), one second rotary body 3x, upward, and the other second rotary body 3z, sideward, from the casing 2.

Figure 9:
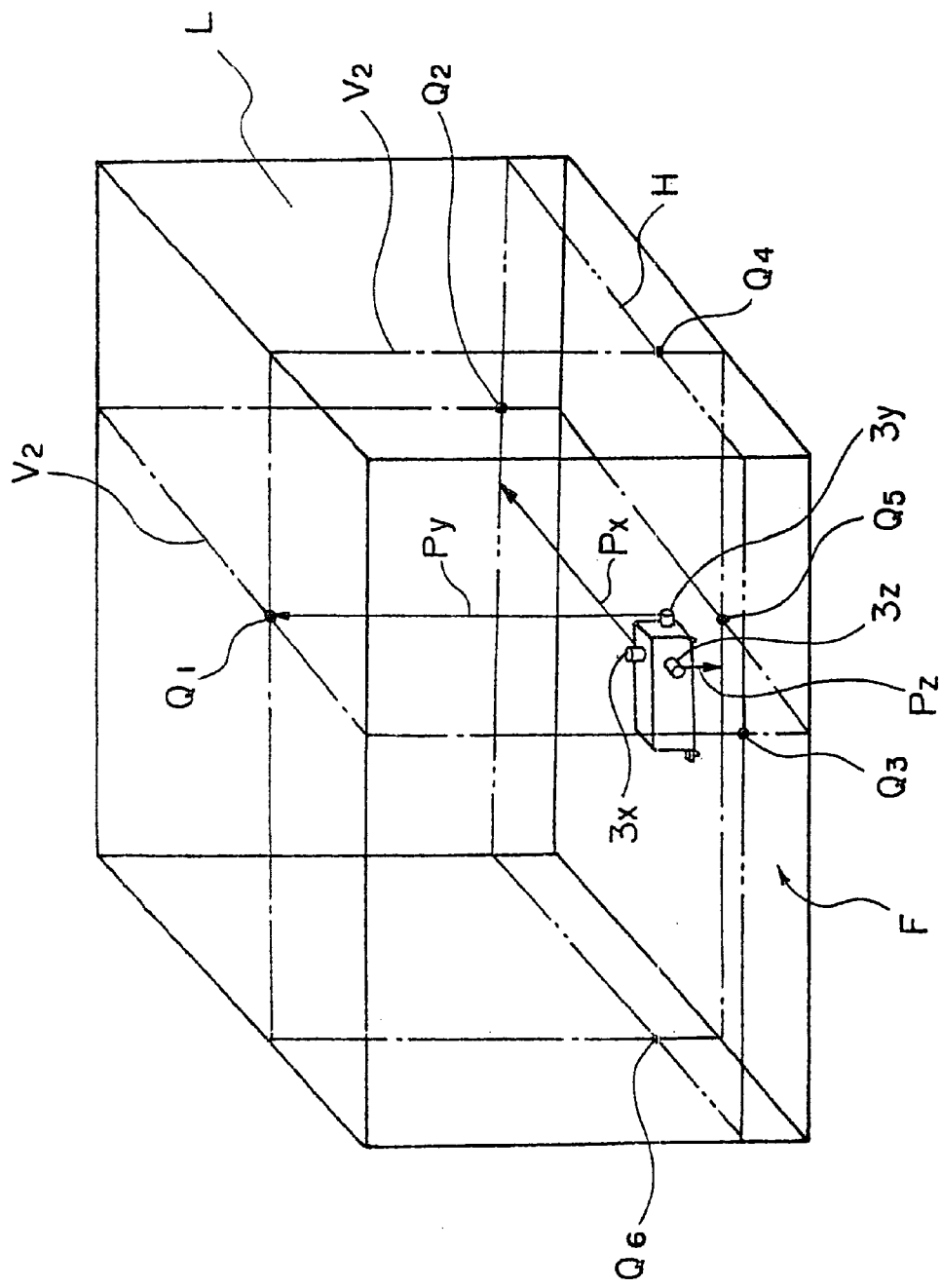
FIG. 9 is a view showing an example where a datum plane setting device 1 is used.
Figure 11:
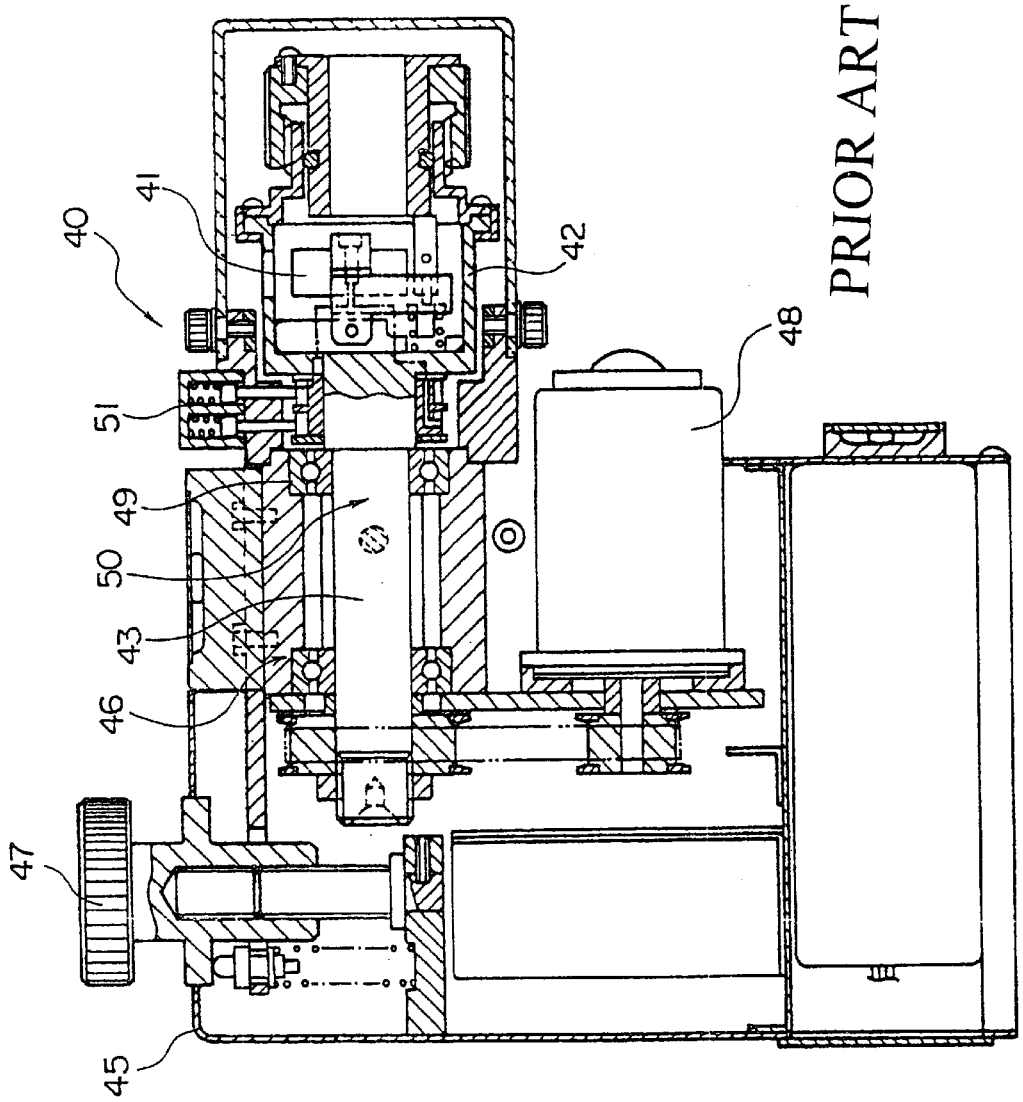
FIG. 11 is a view showing a second prior art of a datum plane setting device.

The rotary bodies perform roles, respectively, wherein; the first rotary body 3y forms a first vertical plane $V_1$ (refer to FIG. 9) by a rotating irradiated plane which a laser light Py emitted in the vertical direction forms, the rotary body 3x as one of the second rotary bodies forms a horizontal plane H (refer to FIG. 9) by a rotating irradiated plane which a laser light Px emitted in the horizontal direction forms, and the other second rotary body 3z forms a second vertical plane $V_2$ (refer to FIG. 9) orthogonal to aforementioned horizontal plane H and the first vertical plane $V_1$ by a rotating irradiated plane which a laser light Pz emitted in the vertical direction forms.

Subsequently, a structure of the rotary bodies 3 (3x, 3y, and 3z) will be described.

Figure 6:
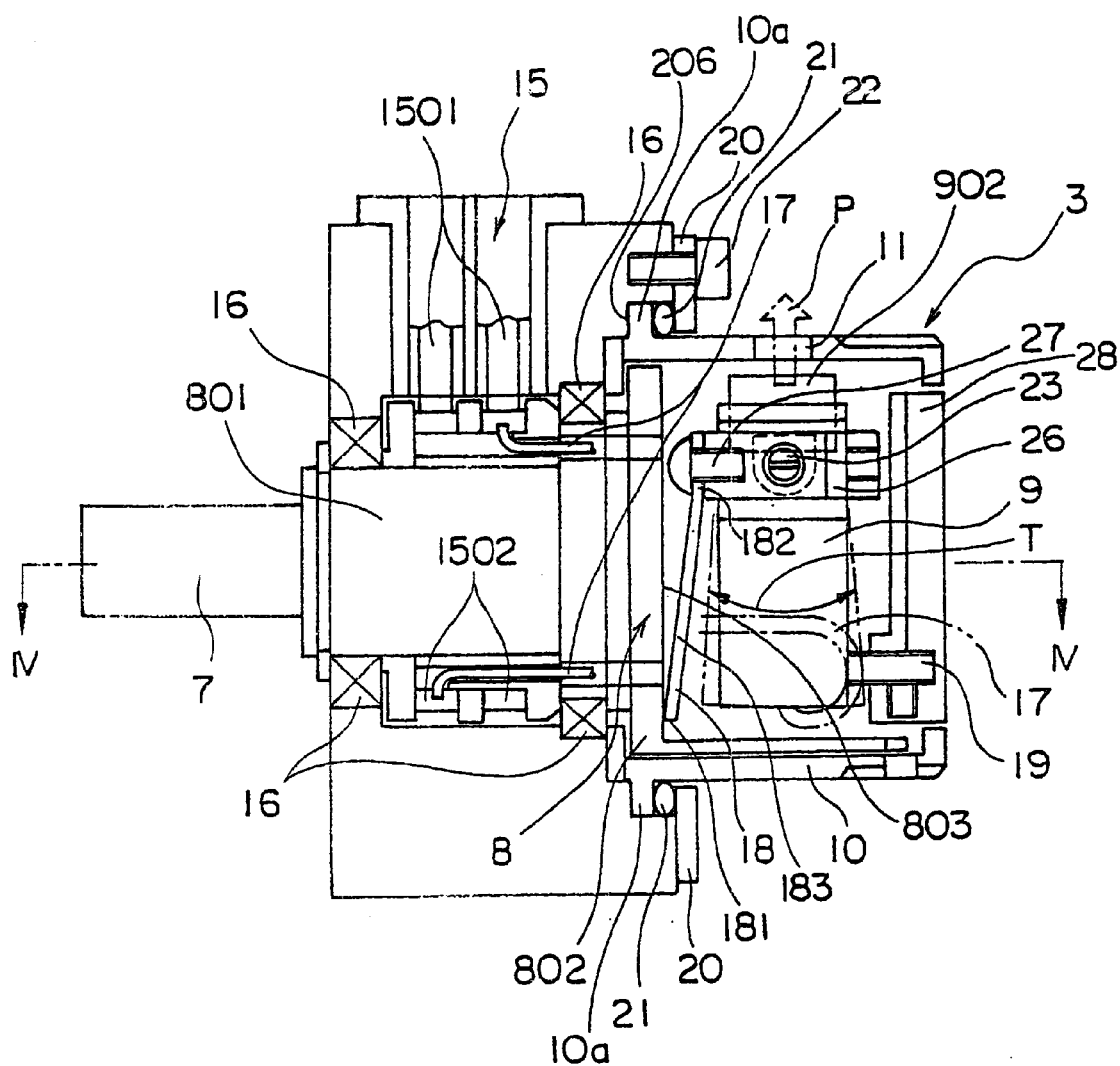
FIG. 6 is a plane view of a rotary body 3 and peripheral members, which are extracted, and showing the inside structure by viewing from directly upward.

First, as shown in FIG. 6 which is a plane view of a rotary body 3 and peripheral members, which are extracted and showing the inside structure by viewing from directly upwards, the rotary body 3 comprises a rotary shaft 7 and a rotary head 8 which is fixed to this rotary shaft 7 and rotates with the rotary shaft 7 as one body. Furthermore, the rotary shaft 7 and rotary head 8 may be formed as one body.

The rotary head 8 consists of a base portion 801 coupled with the rotary shaft 7 and a head portion 802 which is formed in front of the head portion 801 and accommodates a laser emitting portion 9.

The base portion 801 having a cylindrical shape with a slightly greater caliber than that of the rotary shaft 7 is rotatably held by a bearing 16 and on the outer circumferential portion thereof, two current conductive paths 1502 and 1502 are provided to surround in parallel.

To the current conductive paths 1502 and 1502, power supplying brushes 1501 and 1501 communicating with the power source 5 (501) contact, respectively. Then, from the current conductive paths 1502 and 1502, current-transmission cables 17 and 17 are led out, respectively, and connected to the laser emitting portion 9 (refer to FIG. 8).

With this composition, where the shaft 7 rotates, the rotary head 8 also rotates as one body while the laser emitting portion 9 can be securely supplied with current via the current-supplying brushes 1501 and 1501.

Next, a structure inside the head portion 802, that is, a supporting structure of the laser emitting portion 9 will be described.

Figure 7:
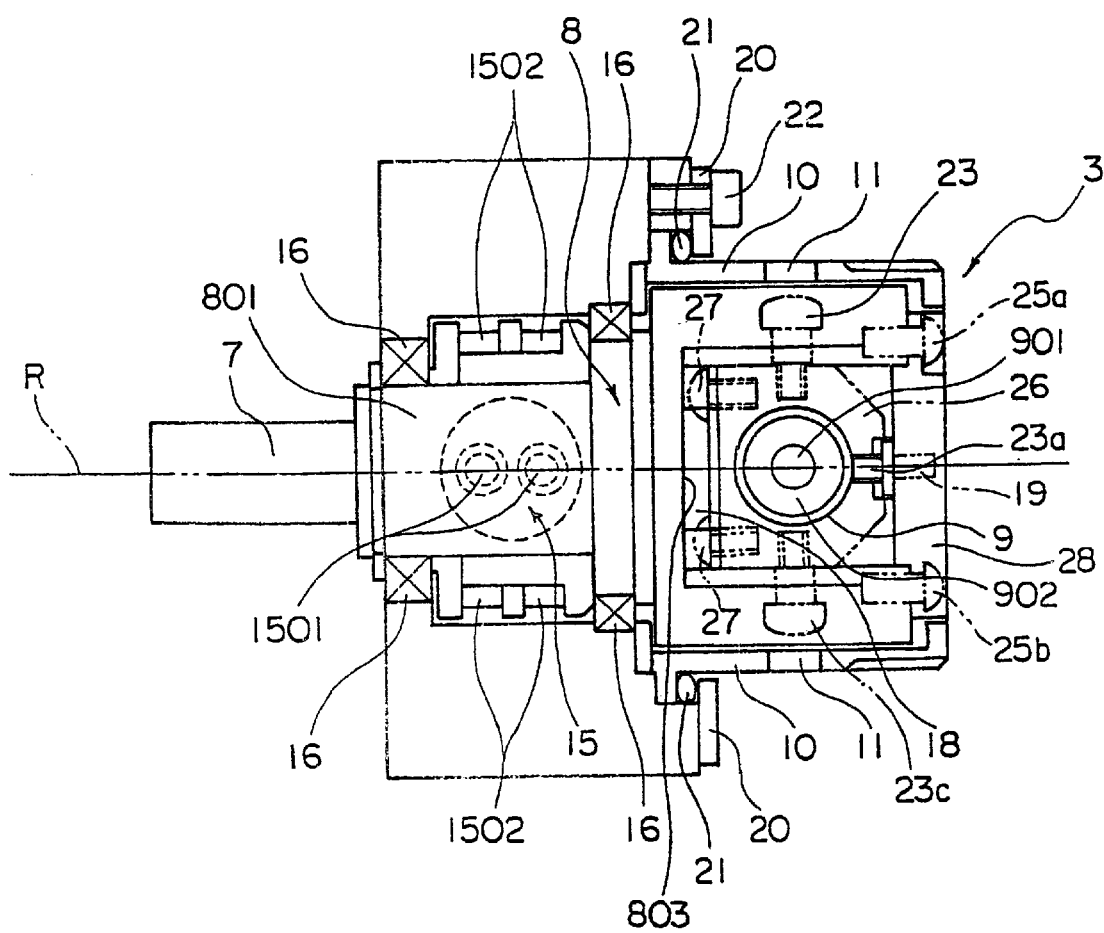
FIG. 7 is a side view of a rotary body 3 and peripheral members, which are extracted, and showing the inside structure by viewing from directly sideward.

The head portion 802 comprising the rotary head 8 has, as shown in FIG. 7, a form in that the horizontal section of the rotary axis line R direction shows an approximate horizontal U-shape (refer to FIG. 7) and the vertical section shows an approximate L-shape (refer to FIG. 6) and holds the laser emitting portion 9 to be orthogonal to the rotary axis line R.

The laser emitting portion 9 has a cylindrical shape and possesses a light emitting element 901 (refer to FIG. 8) at the lower bottom section thereof. Moreover, the laser emitting element 901 is supplied with current via aforementioned current-transmission cables 17 and 17.

Toward the laser emitting portion 9, screws 23a, 23b, and 23c are inserted and attached to a supporting means 26, which is attached to an outer tube portion slightly downward a laser emitting hole 902 opening upward the laser emitting portion 9 and fits between the laser emitting portion 9 and head portion 802, from, in total, the three directions of forward and leftward and rightward, which are orthogonal with each other, in a manner such that the screws penetrate through the supporting means 26.

The screws 23b and 23c thereof play a role of fixing the supporting means 26 against the head portion 802 and also play a role as a rotary axis of the laser emitting portion 9 (and supporting means 26). As for the screw 23a, the tip end portion thereof comes into contact with the outer tube portion of the laser emitting portion 9 and plays a role of fixing the laser emitting portion 9 against the supporting means 26.

According to the composition, the laser emitting portion 9 is suspended rotatably around the screws 23b and 23c in the head portion 802 and accommodated to be supported in the up and down directions.

Furthermore, as shown in FIG. 6, to a rear surface 261 on the rotary shaft 7 side of aforementioned supporting means 26, an attached surface 182 of a leaf spring 18 is fitted and fixed by a pair of screws 27 and 27.

As for the leaf spring 18 as shown in FIG. 6, etc., a slant plate 183 is provided to extend downward (bottom side of the laser emitting portion 9) from the attached portion 182 and has an approximately tongue-like form as a whole.

This leaf spring 18 is disposed in gap formed between the laser emitting portion 9 and a base section side inner surface 803 of the head portion 802 in the up and down directions and, the tip end portion 181 of the leaf spring 18 applies forward force to the laser emitting portion 9 due to a composition in that the tip end portion 108 comes into contact with the base section side inner surface 803.

Meanwhile, in the front section of the lower outer tube portion of the laser emitting portion 9, a screw 19 is inserted from the front and attached in order to come into contact with the outer tube portion of the laser emitting portion 9 and the laser emitting portion 9 is composed, in balance with the applied force of aforementioned leaf spring 18, so as to be positioned orthogonally to the rotary axis line R.

According to the composition, by adjusting an appropriate inserted length of the screw 19, the laser emitting portion 9 is tilted in the arrow mark T direction of FIG. 6 and the angle of the laser emitting portion 9, that is, the laser emitting angle, can be minutely adjusted.

Herein, the head portion 802 is covered and protected by an approximately bowl shaped cover 10 formed out of transparent resin. For this cover 10, a slit 11 for emitting a laser light P outside from the laser emitting portion 9 is provided to surround.

Figure 8:
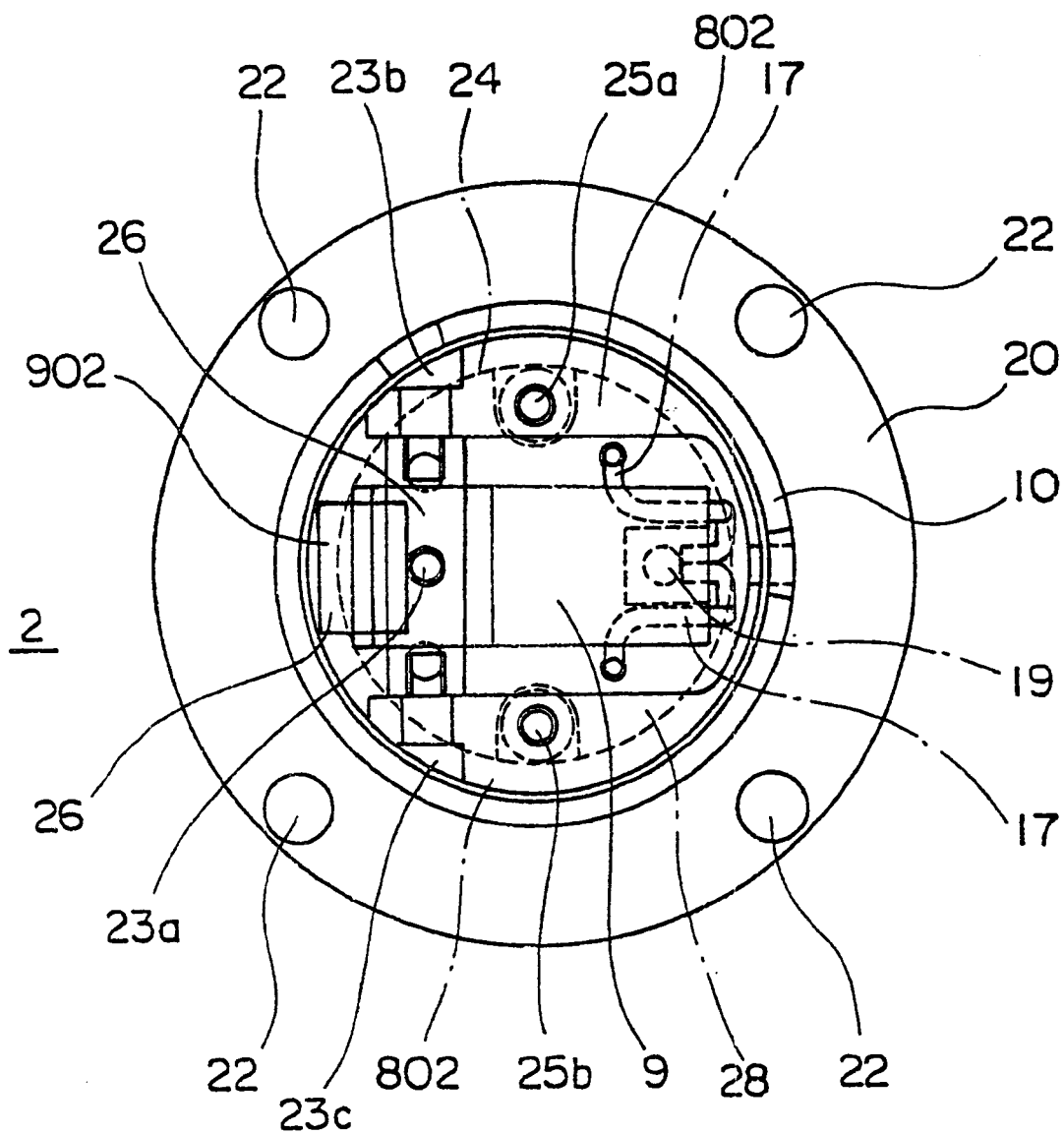
FIG. 8 is a front view of a rotary body 3 portion shown from directly frontwards.

Also, the front portion of the cover 10 is opened and, on the opening portions, a disk shaped lid 28 is fixed to the head portion 802 by screws 25a and 25b (refer to FIG. 8, etc).

An approximately L-shaped peripheral end portion 10a of the cover 10 section is fitted into a cover fitting concave portion 206 formed on the casing 2. An O ring 21 is fitted between a ring member 20 and the peripheral end portion 10a and the ring member 20 is fixed onto the casing 2 by a plurality of screws 22, whereby, the cover 10 is fixed to the casing 2.

Herein, the rotary bodies 3x, 3y, and 3z attached to the device 2 may be composed to be freely attached and removed. According to the composition, the number of desired rotating irradiated planes (1 through 3) is appropriately selected and the rotary bodies 3x, 3y, and 3z can be attached.

In other words, by removing a rotary body 3 forming an undesired rotating irradiated plane whereas, on the portion thereof, by fitting an extremely light dummy member (not shown) without a laser emitting portion 9, synchronous rotation of a plurality of used rotary bodies 3 can be secured, allowing to attempt lighting and simplification of the device 1.

Furthermore, there is provided a composition in that, if the first rotary body 3y is removed, a pulley 12y is provided to surround the rotary axis 601 of the motor 6, therefore, where the first rotary body 3y is removed, it is sufficient to block the opening portion formed on the casing 2 with a lid member (not shown).

As described above, by composing the rotary bodies 3x, 3y, and 3z to be freely attached and removed, for various kinds of easier survey work, a simple device structure in accordance with each work can be employed, whereby providing great convenience.

On the basis of the composition of the device 1 as described above, usage of the device 1, mainly with reference to FIG. 8, will be briefly described.

First, at a site where a survey is carried out, for example, on a floor F of a room L shown in FIG. 8, the device 1 is installed then, horizontality of the casing 2 is secured by turning the leveling adjustment screws 4021 and 4041 while level 29 formed it on the upper surface of the casing 2 is monitored.

Furthermore, it is possible to use the device 1 by placing on a tripod (not shown) having a flat board on the top.

Next, a main power switch $S_5$ is turned on and rotary operation switches $S_2$ through $S_4$ of rotary bodies 3x through 3z assigned for desired datum planes are selected and turned on, whereby, each of rotary bodies 3x through 3z rotates and emits laser lights Px through Py at the same time and forms rotating irradiated planes H, $V_1$, and $V_2$. Moreover, a rotational speed of the rotary bodies 3 is adjusted by operating a speed controller knob $S_1$ controlling rotational speeds of the rotary axis 601 of the motor 6.

In this step, if the rotating irradiated planes H, $V_1$, and $V_2$ are slightly off an aimed position, the position is adjusted by aforementioned unit 4 provided for the casing 2.

Specifically, the casing 2 is slid in the X axis direction (refer to FIG. 4) by turning the first adjusting screw 4055 and the casing 2 is slid in the Y axis direction (refer to FIG. 4) by turning the second adjusting screw 4065.

Moreover, fine emission angle adjustment of laser lights Px, Py, and Pz which are emitted from the rotary bodies 3 is performed by a turning operation of the third adjustment screw 205.

A rotating irradiated plane formed by the second rotary body 3x forms a horizontal datum plane H, allowing to draw a horizontal line on walls, and a rotating irradiated plane formed by the first rotary body 3y forms a first vertical datum plane $V_1$ and a rotating irradiated plane formed by the other second rotary body 3z forms a second vertical datum plane $V_2$, allowing to draw a vertical line on ceilings, floors and walls.

The present device 1 allows to form a plurality of aforementioned datum planes H, $V_1$, and $V_2$ at the same time, whereby, in total, 6 intersectional points Q1 through Q6 of each datum plane H, $V_1$, and $V_2$ are obtained at the same time.

Industrial Applicability

As has been made clear on the basis of the above description, according to the invention, by accommodating the laser emitting portions in the rotary heads and orthogonally arranging a plurality of rotary bodies having these rotary heads, a plurality of orthogonal rotating irradiated planes can be formed at the same time and it becomes possible to promptly obtain intersectional points between respective rotating irradiated planes, whereby contributing to make various survey works speedy and effective.

Also, according to the present invention, it is devised that, by rotating a rotary axis of one motor, the other second rotary bodies are allowed to rotate, therefore, it is not necessary to provide a motor for each rotary body disposed in plurality, whereby lighting the device and simplifying the structure are attained and contribute to improved mobility when transporting the surveying device and reducing device costs.

Furthermore, according to the present invention, the position of the casing, inside which rotary bodies are accommodated and supported, can be adjusted and the angle of the rotary bodies (laser emission) can be finely adjusted, whereby allowing to perform an accurate survey work. Moreover, where a rotary body disposed in the device is composed to be freely attached and removed and, in compliance with the number of desired rotary bodies, rotary bodies are attached in a freely attached and removed manner, the device is more effectively used for general purposes and if there exist an undesired rotating irradiated plane, a corresponding rotary body is removed, whereby simplification and lighting of the device is allowed to be attempted, and accordingly, great convenience is provided.

As has been described, according to the present invention, performance of various survey works is attained more securely, easily, and effectively, thus allowing to broadly contribute to developments in industry including the construction industry.

What is claimed is:

1. A datum plane setting device comprising:

a motor, rotary bodies which rotate in accordance with rotary driving of said motor, rotary head portions formed on the tip end portions of said rotary bodies, laser emitting portions which are accommodated inside said rotary head portions and rotate with said rotary heads as one body, a power source portion which supplies current for the motor and laser emitting portions, a casing which accommodates at least the motor, rotary bodies, the power source portion, supporting members of said casing horizontally supporting thereof, and a level confirming a horizontal level of said casing, wherein the laser emitting portions are composed so that current is supplied from the power source portion via current-supplying brushes which contact guiding paths provided to surround the rotary bodies, wherein said rotary bodies include a first rotary body fixed to a rotary axis of the motor and at least one or more second rotary bodies which rotate with the first rotary body simultaneously via a belt which is wound around a pulley formed on the rotary axis portion.

2. A datum plane setting device comprising:

a motor, rotary bodies which rotate in accordance with rotary driving of said motor, rotary head portions formed on the tip end portions of said rotary bodies, laser emitting portions which are accommodated inside said rotary head portions and rotate with said rotary heads as one body, a power source portion which supplies current for the motor and laser emitting portions, a casing which accommodates at least the motor, rotary bodies, the power source portion, supporting members of said casing horizontally supporting thereof, and a level confirming a horizontal level of said casing, wherein the laser emitting portions are composed so that current is supplied from the power source portion via current-supplying brushes which contact guiding paths provided to surround the rotary bodies, with respect to the rotary bodies, at least two rotary bodies or more are disposed and such a plurality of rotary bodies are rotatable simultaneously, and further including a positional adjusting unit for allowing said supporting members to be adjustably slidable in X axis and Y axis directions relative to said casing.

3. A datum plane setting device comprising:

a motor, rotary bodies which rotate in accordance with rotary driving of said motor, rotary head portions formed on the tip end portions of said rotary bodies, laser emitting portions which are accommodated inside said rotary head portions and rotate with said rotary heads as one body, a power source portion which supplies current for the motor and laser emitting portions, a casing which accommodates at least the motor, rotary bodies, the power source portion, supporting members of said casing horizontally supporting thereof, and a level confirming a horizontal level of said casing, wherein the laser emitting portions are composed so that current is supplied from the power source portion via current-supplying brushes which contact guiding paths provided to surround the rotary bodies, with respect to the rotary bodies, at least two rotary bodies or more are disposed and such a plurality of rotary bodies are rotatable simultaneously, wherein said supporting members are arranged so as to support the casing, in total, at four points forming a square against the device setting surface, wherein one point of said supporting members is a fixing supporting member and another point on the diagonal line is a buffering supporting member which applies force upward by an elastic member, and for two supporting members existing on the remainder of the diagonal line, a leveling adjustment screw for a horizontal leveling adjustment is provided, respectively.

4. A datum plane setting device comprising:

a motor, rotary bodies which rotate in accordance with rotary driving of said motor, rotary head portions formed on the tip end portions of said rotary bodies, laser emitting portions which are accommodated inside said rotary head portions and rotate with said rotary heads as one body, a power source portion which supplies current for the motor and laser emitting portions, a casing which accommodates at least the motor, rotary bodies, the power source portion, supporting members of said casing horizontally supporting thereof, and a level confirming a horizontal level of said casing, wherein the laser emitting portions are composed so that current is supplied from the power source portion via current-supplying brushes which contact guiding paths provided to surround the rotary bodies, with respect to the rotary bodies, at least two rotary bodies or more are disposed and such a plurality of rotary bodies are rotatable simultaneously, wherein the rotary bodies are arranged to be freely attached and removed.

5. A datum plane setting device comprising:

a motor, rotary bodies which rotate in accordance with rotary driving of said motor, rotary head portions formed on the tip end portions of said rotary bodies, laser emitting portions which are accommodated inside said rotary head portions and rotate with said rotary heads as one body, a power source portion which supplies current for the motor and laser emitting portions, a casing which accommodates at least the motor, rotary bodies, the power source portion, supporting members of said casing horizontally supporting thereof, and a level confirming a horizontal level of said casing, wherein the laser emitting portions are composed so that current is supplied from the power source portion via current-supplying brushes which contact guiding paths provided to surround the rotary bodies, with respect to the rotary bodies, at least two rotary bodies or more are disposed and such a plurality of rotary bodies are rotatable simultaneously, and further including a positional adjustment unit for adjustably and slidably moving said supporting members relative to the casing such that said laser emitting portions of said rotating head portions are adjustably and slidably movable with respect to said casing.

* * * * *